US010762425B2

(12) United States Patent
Liu et al.

(10) Patent No.: US 10,762,425 B2
(45) Date of Patent: Sep. 1, 2020

(54) LEARNING AFFINITY VIA A SPATIAL PROPAGATION NEURAL NETWORK

(71) Applicant: NVIDIA Corporation, Santa Clara, CA (US)

(72) Inventors: Sifei Liu, Santa Clara, CA (US); Shalini De Mello, San Francisco, CA (US); Jinwei Gu, San Jose, CA (US); Ming-Hsuan Yang, Sunnyvale, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 163 days.

(21) Appl. No.: 16/134,716

(22) Filed: Sep. 18, 2018

(65) Prior Publication Data

US 2019/0095791 A1    Mar. 28, 2019

Related U.S. Application Data

(60) Provisional application No. 62/563,538, filed on Sep. 26, 2017.

(51) Int. Cl.
*G06K 9/46* (2006.01)
*G06N 5/04* (2006.01)
(Continued)

(52) U.S. Cl.
CPC ............. *G06N 3/08* (2013.01); *G06K 9/4609* (2013.01); *G06K 9/6273* (2013.01);
(Continued)

(58) Field of Classification Search
None
See application file for complete search history.

(56) References Cited

U.S. PATENT DOCUMENTS 7,630,517 B2    12/2009 Mirowski et al.
8,553,980 B2    10/2013 Ahn et al.
(Continued)

FOREIGN PATENT DOCUMENTS

CN    103413279 B    2/2016
CN    103390063 B    8/2016
(Continued)

OTHER PUBLICATIONS

Ahn et al., "Learning Pixel-level Semantic Affinity with Image-Level Supervision for Weakly Supervised Semantic Segmentation," Preprint, Apr. 2018, retrieved from http://openaccess.thecvf.com/content_cvpr_2018/papers/Ahn_Learning_Pixel-Level_Semantic_CVPR_2018_paper.pdf, 14 pages.
(Continued)

*Primary Examiner* — Idowu O Osifade
(74) *Attorney, Agent, or Firm* — Leydig, Voit & Mayer, Ltd.

(57) ABSTRACT

A spatial linear propagation network (SLPN) system learns the affinity matrix for vision tasks. An affinity matrix is a generic matrix that defines the similarity of two points in space. The SLPN system is trained for a particular computer vision task and refines an input map (i.e., affinity matrix) that indicates pixels the share a particular property (e.g., color, object, texture, shape, etc.). Inputs to the SLPN system are input data (e.g., pixel values for an image) and the input map corresponding to the input data to be propagated. The input data is processed to produce task-specific affinity values (guidance data). The task-specific affinity values are applied to values in the input map, with at least two weighted values from each column contributing to a value in the refined map data for the adjacent column.

20 Claims, 11 Drawing Sheets

(51) Int. Cl.
*G06K 9/62* (2006.01)
*G06N 3/08* (2006.01)
*G06T 7/90* (2017.01)
*G06T 7/11* (2017.01)
*G06N 3/04* (2006.01)

(52) U.S. Cl.
CPC ........... *G06N 3/0454* (2013.01); *G06N 3/084* (2013.01); *G06N 5/046* (2013.01); *G06T 7/11* (2017.01); *G06T 7/90* (2017.01); *G06T 2207/10024* (2013.01); *G06T 2207/20081* (2013.01); *G06T 2207/20084* (2013.01)

(56) References Cited

U.S. PATENT DOCUMENTS

| 9,342,873 | B1 | 5/2016 | Barron |
| 9,898,856 | B2 | 2/2018 | Yang et al. |
| 10,032,089 | B2 | 7/2018 | Jaderberg et al. |
| 2017/0278246 | A1 | 9/2017 | Kim |
| 2018/0122071 | A1 | 5/2018 | Bozorgtabar et al. |
| 2019/0236394 | A1* | 8/2019 | Price ................... G06K 9/4628 |

FOREIGN PATENT DOCUMENTS

| CN | 107066916 A | 8/2017 |
| CN | 105046701 B | 9/2017 |
| CN | 107506761 A | 12/2017 |

OTHER PUBLICATIONS

Li et al., "Contrast-Oriented Deep Neural Networks for Salient Object Detection," Preprint, Transactions on Neural Networks and Learning Systems, Mar. 2018, 14 pages.

Li et al., "DeepSaliency: Multi-Task Deep Neural Network Model for Salient Object Detection," Preprint, IEEE Transactions on Image Processing, Jun. 2016, 12 pages.

Qu et al., "RGBD Salient Objection Detection via Deep Fusion," Journal of Latex Class Files, vol. 14, No. 8, Aug. 2015, pp. 1-12.

Kao et al., "Sampling Technique Analysis of Nystrom Approximation in Pixel-Wise Affinity Matrix," 2012 IEEE International Conference on Multimedia and Expo, Jul. 9-13, 2012, 6 pages.

* cited by examiner

US 10,762,425 B2

LEARNING AFFINITY VIA A SPATIAL PROPAGATION NEURAL NETWORK

CLAIM OF PRIORITY

This application claims the benefit of U.S. Provisional Application No. 62/563,538 titled "Learning Affinity Via Spatial Propagation Networks," filed Sep. 26, 2017, the entire contents of which is incorporated herein by reference.

FIELD OF THE INVENTION

The present invention relates to computer vision, and in particular, to a spatial linear propagation network (SLPN) system for learning affinity matrices for vision tasks.

BACKGROUND

An affinity matrix is a generic matrix that measures pairwise relationships between points, indicating how close, or similar, two points are in a space. Affinity matrices are widely used in computer vision problems, representing a weighted graph that regards each pixel as a node and connects each pair of pixels by an edge. The weight (affinity value) on an edge should reflect the pairwise similarity with respect to a task. For example, for low-level vision tasks such as image filtering, the affinity values should reveal the low-level coherence of color and texture; for mid to high-level vision tasks such as image matting and segmentation, the affinity values should reveal the semantic-level pairwise similarities. Most techniques explicitly or implicitly assume a measurement or a similarity structure over the space of configurations. The success of a technique depends heavily on the assumptions made to construct the affinity matrices, which are generally constructed manually. There is a need for addressing these issues and/or other issues associated with the prior art.

SUMMARY

A spatial linear propagation network (SLPN) system learns the affinity matrix for vision tasks. An affinity matrix is a generic matrix that defines the similarity of two points in space. The SLPN system is trained for a particular computer vision task and refines an input map (i.e., affinity matrix) that indicates pixels the share a particular property (e.g., color, object, texture, shape, etc.). Inputs to the SLPN system are input data (e.g., pixel values for an image) and the input map corresponding to the input data to be propagated. The input data is processed to produce task-specific affinity values (guidance data). In an embodiment, the task-specific affinity values are applied to values in the input map, with at least two weighted values from each previous column or row contributing to a value in the refined map data for the adjacent column or row, respectively. In an embodiment, three weighted values from each column or row contribute to a value in the refined map data for the adjacent column or row, respectively.

A method, computer readable medium, and system are disclosed for learning affinity. A spatial propagation neural network including a spatial linear propagation module receives an input map defining properties of pixels in an image. The spatial linear propagation module receives task-specific affinity values for the pixels in the image. The spatial linear propagation module processes the input map and the task-specific affinity values to produce refined map data, where at least two task-specific affinity values aligned in a first pixel dimension are applied to spatially corresponding values in the input map to generate each refined value of the refined map data.

DETAILED DESCRIPTION

An affinity matrix is a spatially varying transformation matrix that defines the similarity of two points in space. Examples of affinity-related computer vision tasks include image matting, segmentation, and colorization. A spatial linear propagation network (SLPN) system learns the task-specific affinity matrix for vision tasks in a data driven manner. As described herein, the SLPN system may be implemented as a row/column linear propagation model for learning the affinity matrix instead of designing similarity kernels heuristically. The SLPN system is a row/column linear propagation mode and the task-specific affinity matrix that is learned models dense, global pairwise relationships of an image.

Figure 1A:
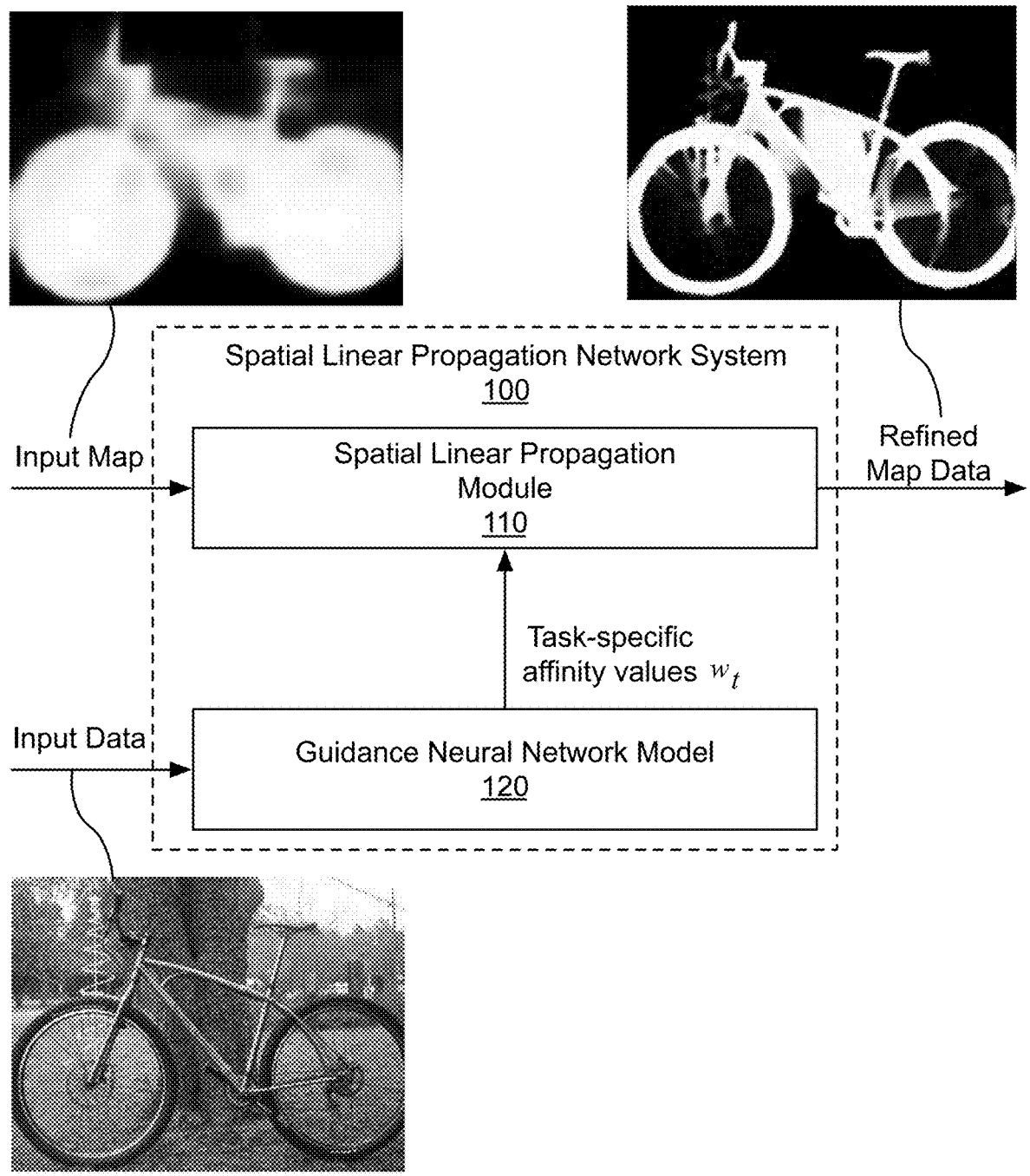
FIG. 1A illustrates a block diagram of a spatial linear propagation network (SLPN) system, in accordance with an embodiment.

FIG. 1A illustrates a block diagram of the SLPN system 100, in accordance with an embodiment. Although the SLPN system 100 is described in the context of a neural network model, the SLPN system 100 may also be performed by a program, custom circuitry, or by a combination of custom circuitry and a program. For example, the SLPN system 100 may be implemented using a GPU (graphics processing unit), CPU (central processing unit), or any processor capable of performing the operations described herein. Furthermore, persons of ordinary skill in the art will understand that any system that performs the operations of the SLPN system 100 is within the scope and spirit of embodiments of the present invention.

As shown in FIG. 1A, the SLPN system 100 includes a guidance neural network model 120 and a spatial linear propagation module 110. The SLPN system 100 is trained for a particular computer vision task. During training, parameters of the guidance neural network model 120 and coefficients used for propagation in the spatial linear propagation module 110 are determined. In an embodiment, the guidance neural network model 120 is a deep convolutional neural network (CNN).

Inputs to the SLPN system 100 are input data (e.g., pixel values for an image) and an input map corresponding to the input data to be propagated. The input map defines pixel properties (e.g., color, object, texture, shape, etc.) for at least a portion of the pixels in the input data. For example, as shown in FIG. 1A, the input data is an image of a bicycle in front of a background and the input map coarsely identifies pixels that define the bicycle, segmenting pixels representing the bicycle from pixels representing the background. In an embodiment, the input data and input map are each an array (at least 2 dimensions).

The guidance neural network model 120 processes the input data according to the parameters to produce guidance data (task-specific affinity values). In an embodiment, the task-specific affinity values are a set of arrays, including an array for each channel of input data (e.g., red, green, blue). Furthermore, in an embodiment, a separate set of arrays is included for each propagation direction used by the spatial linear propagation module 110 to process the input map. For example, the propagation directions may be left-to-right (columns), right-to-left (columns), top-to-bottom (rows), and bottom-to-top (rows).

Inputs to the spatial linear propagation module 110 are the input map and the guidance data that are used as weights (or coefficients) for processing the input map to produce refined map data. The spatial linear propagation module 110 propagates information in an image, defined by the input map, based on the task-specific affinity values generated by the guidance neural network model 120. As shown in FIG. 1A, the refined map data identifies pixels that define the bicycle more accurately compared with the input map, thereby enabling more precise segmentation of pixels representing the bicycle from pixels representing the background.

The guidance neural network model 120 and the spatial linear propagation module 110 are differentiable and may be jointly trained using the stochastic gradient descent (SGD) loss function. In an embodiment, the spatial linear propagation module 110 is implemented as recurrent architecture and is therefore computationally efficient for inference due to the linear time complexity of the recurrent architecture.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

The advantages of learning a task-specific affinity matrix in a data-driven manner are multifold. First, a hand-designed similarity matrix based on a distance metric in a certain space (e.g., RGB or Euclidean) may not adequately describe the pairwise relationships in the mid-to-high-level feature spaces. To apply such designed pairwise kernels to tasks such as semantic segmentation, multiple iterations are required for satisfactory performance. In contrast, the guidance neural network model 120 learns and outputs all entities of an affinity matrix under direct supervision of ultimate objectives, where no iteration, specific design or assumption about the kernel function is needed. Second, in an embodiment, high-level semantic affinity measures may be learned by initializing the guidance neural network model 120 with hierarchical deep features from a pre-trained neural network where conventional metrics and kernels may not be applied.

By constructing a row/column-oriented linear propagation model, a spatially varying transformation matrix exactly constitutes a task-specific affinity matrix that models dense, global pairwise relationships of pixels in an image. In an embodiment, a three-way row/column connection is used for the spatial linear propagation module 110, which (a) formulates a sparse transformation matrix, where all elements can be outputs from a deep CNN, but (b) results in a dense affinity matrix that effectively models any task-specific pairwise similarity matrix. Instead of designing the similarity kernels according to image features of two points, all of the similarities can be directly output by the guidance neural network model 120 in a purely data-driven manner. The spatial linear propagation network system 100 provides a generic framework that can be applied to many affinity-related tasks, such as image matting, segmentation, colorization, and the like. Essentially, the guidance neural network model 120 can learn semantically-aware affinity values for high-level vision tasks due to the powerful learning capability of deep CNNs. The spatial linear propagation network system 100 provides a general, effective and efficient solution for generating high-quality segmentation results.

The problem of learning the task-specific affinity matrix can be equivalently expressed as learning a group of small row/column-wise, spatially varying linear transformation matrices. Since a linear transformation can be implemented as a differentiable module in a deep neural network, the transformation matrix can be learned in a purely data-driven manner as opposed to being constructed by hand. Specifically, RGB images may be used as input data and the task-specific affinity is learned by the guidance neural network model 120 conditioned on the specific input data. A three-way connection may be used, instead of full connections between adjoining rows/columns. The three-way connection is sufficient for learning a dense affinity matrix and requires many fewer output channels of a deep CNN.

Figure 1B:
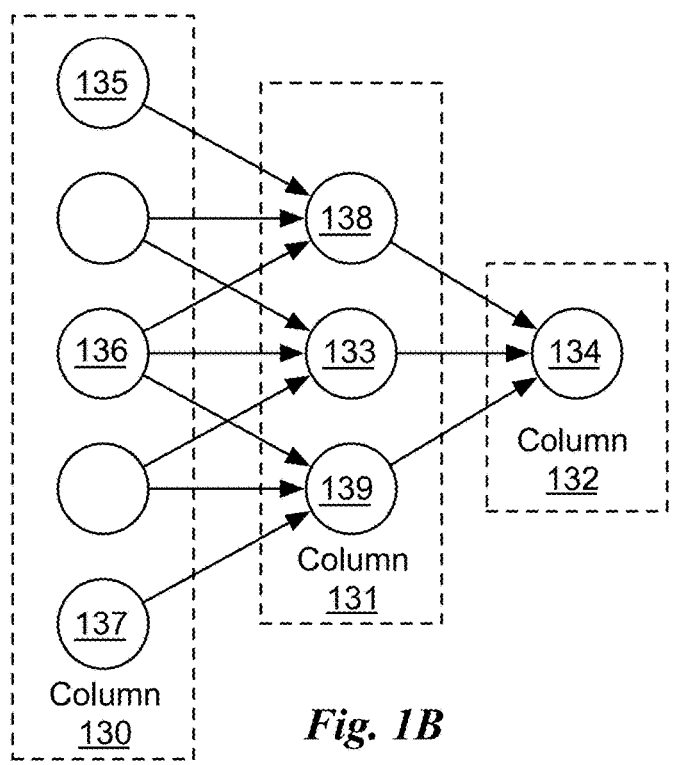
FIG. 1B illustrates a conceptual diagram of 3-way propagation from left-to-right, in accordance with an embodiment.

FIG. 1B illustrates a conceptual diagram of 3-way propagation from left-to-right, in accordance with an embodiment. The task-specific affinity values computed by the guidance neural network model 120 are applied to values in the input map, where each pixel of the input map is represented as a circle and each task-specific affinity value (weight) is represented as an arrow. At least two weighted values from each column of the task-specific affinity matrix contributing to a value in the refined map data for the adjacent column. As shown in FIG. 1A, three weighted values from a first column 130 contribute to each of the three values in a second column 131 in a left-to-right propagation direction. The three values in the second column 131 contribute to the value in a third column 132. The 3-way propagation is repeated to produce each pixel value of the refined map data.

When a one-way connection is used the value 136 in the first column 130, the value 133 in the second column 131, and the value 134 in the third column 132 contribute to a pixel value of the refined map data. The one-way connection enables every pixel of the input map to connect to only one pixel from the previous column. The one-way connection is equivalent to one-dimensional (1D) linear recurrent propagation that scans each column independently as a 1D sequence. The left-to-right propagation for a one-way connection is:

$$h_{k,t}=(1-p_{k,t})\cdot x_{k,t}+p_{k,t}h_{k,t-1}, \quad (1)$$

where $x_{k,t}$ and $h_{k,t}$ are the $k^{th}$ pixels in the $t^{th}$ column and p is a scaler weight indicating the propagation strength between the pixels at $\{k, t-1\}$ and $\{k, t\}$. The one-way connection is a direct extension of sequential recurrent propagation, and, for semantic segmentation, p corresponds to the object edges.

As shown in FIG. 1B, a three-way connection enables each pixel to connect to three pixels from the previous row/column, i.e., the left-top, middle and bottom pixels from the previous column for the left-to-right propagation direction. $\mathbb{N}$ denotes the set of the three pixels and the left-to-right propagation for a three-way connection is:

$$h_{k,t}=(1-\Sigma_{k\in\mathbb{N}}p_{k,t})x_{k,t}+\Sigma_{k\in\mathbb{N}}p_{k,t}h_{k,t-1}, \quad (2)$$

where $x_{k,t}$ and $h_{k,t}$ are the $k^{th}$ pixels in the $t^{th}$ column and p is a scaler weight indicating the propagation strength between the pixels at $\{k, t-1\}$ and $\{k, t\}$.

In an embodiment, two-way propagation is used, where two of the three values in the column 130 are weighted and propagated by the spatial linear propagation module 110 to two of the values in column 131. For example, the values 135, 136, 137, 138, 139, and 134 contribute to a pixel value in the refined map data. The two-way propagation is performed by the spatial linear propagation module 110 for each pixel in the refined map data. When two-way propagation is performed using equation (2), $\mathbb{N}$ denotes the set of the two pixels and the left-to-right propagation for a two-way connection.

Figure 1C:
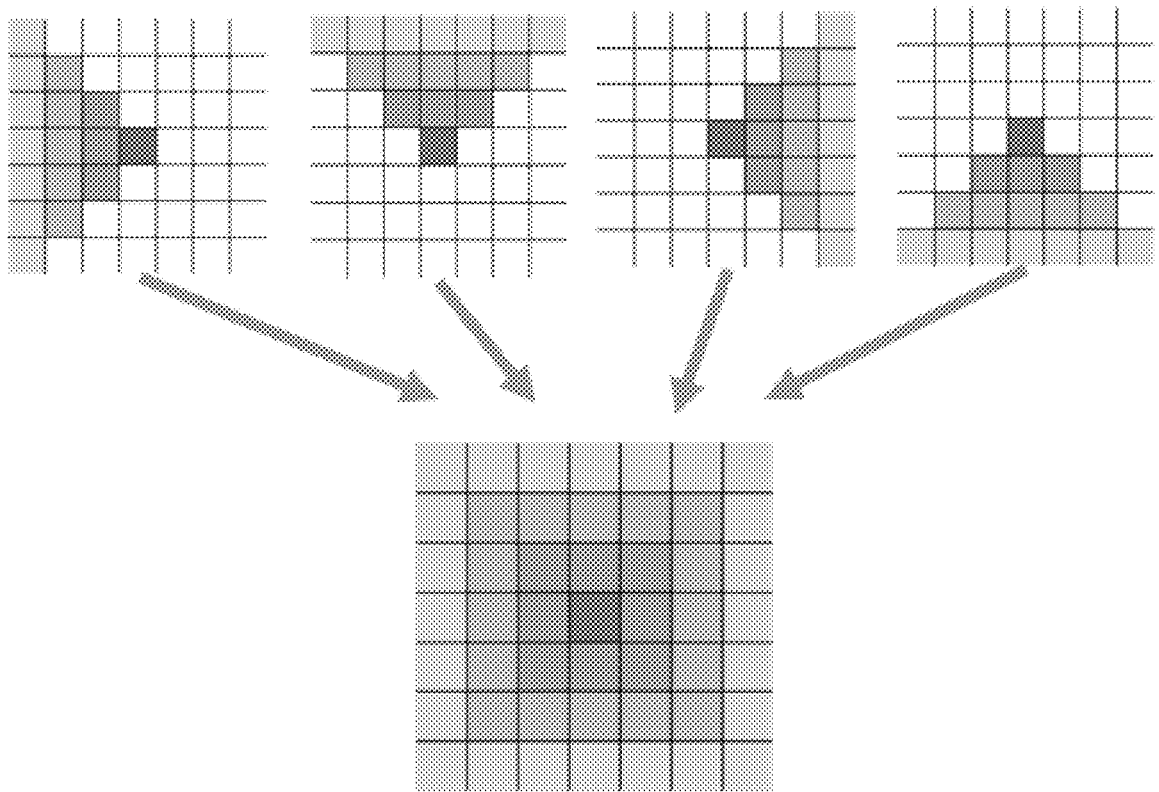
FIG. 1C illustrates a conceptual diagram of 3-way propagation in four directions, in accordance with an embodiment.

The propagation may be performed in more than one direction to generate each pixel value in the refined map data. FIG. 1C illustrates a conceptual diagram of three-way propagation in four directions, in accordance with an embodiment. The entire input map may be scanned row/column-wise in four fixed directions: left-to-right, top-to-bottom, and vise-verse. Equation (2) may be computed by the spatial linear propagation module 110 to compute a contribution from each of the four directions and the contributions may be combined to produce a value for each pixel of the refined map data. Integration of the four directions formulates global and densely connected pairwise relations between the pixels. In an embodiment, the propagation computation is performed recursively by column or row of the input data and each propagation direction may be traversed in parallel by the spatial linear propagation module 110 and combined to generate the refined map data.

In contrast with the three-way propagation technique, a conventional technique for applying a linear transformation to the input map requires more propagation computations for each pixel of the input map because each pixel in a first row/column is propagated to each and every pixel in a subsequent row/column. As an example, the left-to-right direction is described as an example for the following discussion. Other directions are processed independently in the same manner. X and H denote two 2D maps of size n×n, with exactly the same dimensions as the matrix before and after spatial propagation, where $x_t$ and $h_t$, respectively, represent their $t^{th}$ columns with n×1 elements each. Information is linearly propagated from left-to-right between adjacent columns using an n×n linear transformation matrix $w_t$ as:

$$h_t=(I-d_t)x_t+w_th_{t-1}, \; t\in[2,n] \quad (3)$$

where I is the n×n identity matrix, the initial condition $h_1=x_1$, and dt(i, i) is a diagonal matrix, whose $i^{th}$ element is the sum of all the elements of the $i^{th}$ row of $w_t$ except $w_t(i,j)$ as:

$$d_t(i,i)=\Sigma_{j=1,j\neq i}^n w_t(i,j). \quad (4)$$

To propagate across the entire image, the matrix H, where $\{_t\in H, t\in[1, n]\}$, is updated in a column-wise manner recursively. For each column. $h_t$ is a linear, weighted combination of the previous column $h_{t-1}$, and the corresponding column $x_t$ in X. When the recursive scanning is finished, the updated 2D matrix H can be expressed with an expanded formulation of Equation (3):

$$\begin{bmatrix} I & 0 & \cdots & \cdots & 0 \\ w_2 & \lambda_2 & 0 & \cdots & \cdots \\ w_3w_2 & w_3\lambda_2 & \lambda_3 & 0 & \cdots \\ \vdots & \vdots & \vdots & \cdots & \vdots \\ \vdots & \vdots & \vdots & \cdots & \lambda_n \end{bmatrix} X_v = GX_v, \quad (5)$$

where G is a lower triangular, N×N (N=$n^2$) transformation matrix, which relates X and H. $H_v$ and $X_v$ are vectorized versions of X and H, respectively, with the dimension of N×1. Specifically, $H_v$ and $X_v$ are created by concatenating $h_t$ and $x_t$ along the same, single dimension, i.e., $H_v=[h_1^T, \ldots, h_n^T]^T X_v=[x_1^T, \ldots, x_n^T]^T$. All the parameters $\{\lambda_t, w_t, d_t, I\}$, $t\in[2, n]$ are n×n sub-matrices, where $\lambda_t=I-d_t$.

In contrast with conventional techniques, an affinity matrix A computed by the guidance neural network model 120 is the off-diagonal part of the matrix G.

$$A = \begin{bmatrix} 0 & 0 & \cdots & \cdots & 0 \\ w_2 & 0 & 0 & \cdots & \cdots \\ w_3w_2 & w_3\lambda_2 & 0 & 0 & \cdots \\ \vdots & \vdots & \vdots & \cdots & \vdots \\ \vdots & \vdots & \vdots & \cdots & 0 \end{bmatrix} \quad (6)$$

Equation (6) represents a spatial anisotropic diffusion process. A property of the row/column-wise linear propagation in Equation (3) is a standard diffusion process where L defines the spatial propagation and A, the affinity matrix, describes the similarities between any two points. L=D−A, where L is a Laplacian matrix, D is the degree matrix composed of $d_t$ in Equation (4), and A is the affinity matrix. Learning the affinity matrix A is equivalent to learning a group of transformation matrices $w_t$ in Equation (3).

However, the affinity matrix shown in Equation (6), uses a fully-connected spatial propagation in four separate directions, presenting an enormous computational load for a neural network. Therefore, the number of connections is reduced, so that instead of being fully-connected, the connections for each pixel are reduced to at least two. As an example, when the input data has c channels, the output needs n×c×4 channels (there are n connections from the previous row/column per pixel per channel, and with four different directions). Obviously, the output is too large (e.g., a 128×128×16 feature map needs an output of 128×128×8192) to be implemented in a real-world system. Instead of using full connections between the adjacent rows/columns, certain local connections, corresponding to a sparse row/column-wise transform matrix, can also formulate densely connected affinity for a task.

In an embodiment, as shown in FIG. 1B, each pixel is connected to three nearest pixels in the previous row or column. In contrast with the conventional technique, when the three-way propagation technique is used, the task-specific affinity matrix $w_t$ forms a tridiagonal matrix, constituted by all $w_t$ for $t \in [2, n]$, with the three non-zero elements in each column constituted by $p_{k,t}$, $k \in \mathbb{N}$ from Equations (1) and (2). In an embodiment, task-specific affinity matrices are generated for each propagation direction and for each channel of the input data.

When one-way connections are used, the affinity matrix A is sparse since each sub-matrix of A has nonzero elements only along the diagonal, and the multiplication of several individual diagonal matrices will also result in a diagonal matrix. On the other hand, the three-way connection, also with a sparse $w_t$, can form a relatively dense affinity matrix A with the multiplication of several different tridiagonal matrices. Therefore, pixels can be densely and globally associated, by simply increasing the number of connections of each pixel during spatial propagation from one to three. The propagation of one-way connections is restricted to a single row, while the three-way connections can expand the region to a triangular 2D plane with respect to each direction, as shown in FIG. 1B. The summarization of the four directions result in dense connections of all pixels to each other, as shown in FIG. 1C.

Figure 1D:
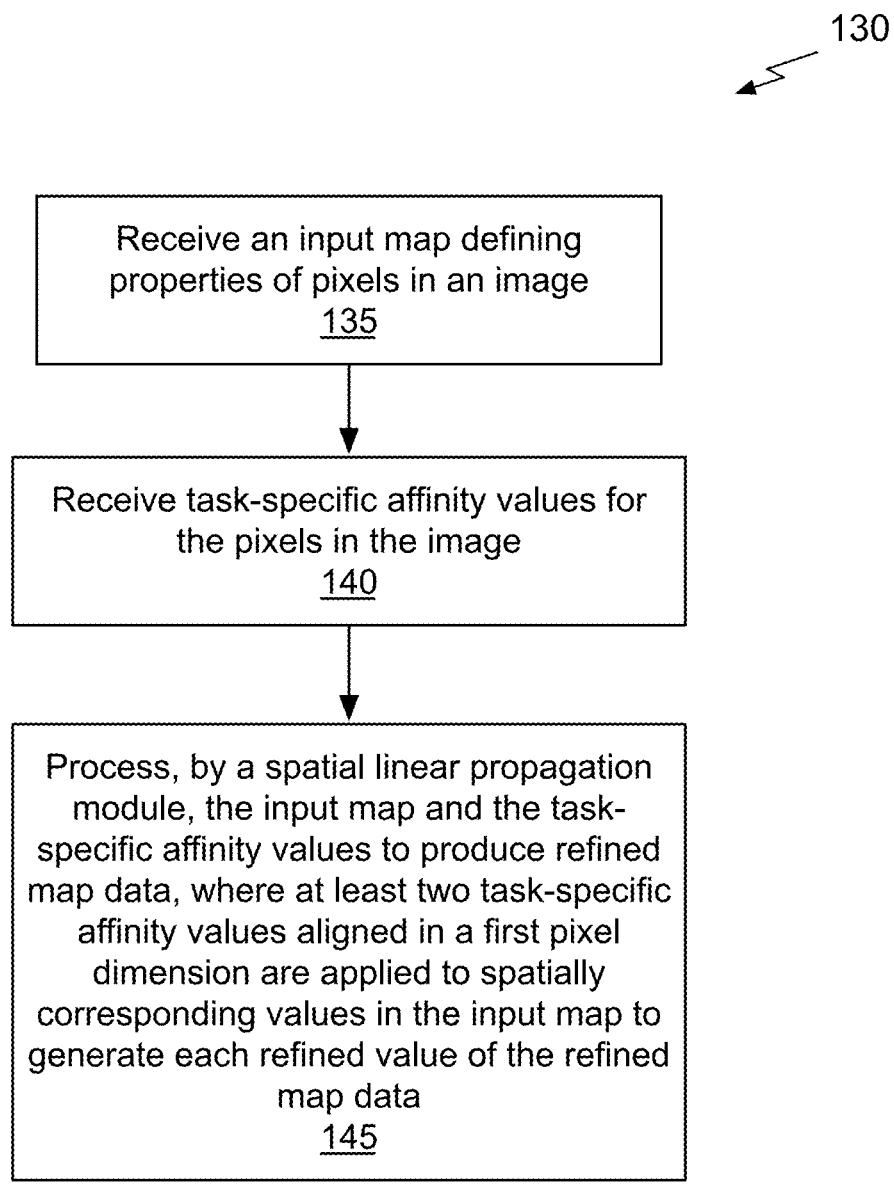
FIG. 1D illustrates a flowchart of a method for generating a refined affinity matrix using the system shown in FIG. 1A, in accordance with an embodiment.

FIG. 1D illustrates a flowchart of a method for generating a refined map data, in accordance with an embodiment. Although method 130 is described in the context of a processing unit, the method 130 may also be performed by a program, custom circuitry, or by a combination of custom circuitry and a program. For example, the method 130 may be executed by a GPU (graphics processing unit), CPU (central processing unit), or any processor capable of performing the spatial linear propagation operations. Furthermore, persons of ordinary skill in the art will understand that any system that performs method 130 is within the scope and spirit of embodiments of the present invention.

At step 135, the spatial linear propagation module 110 receives an input map defining properties of pixels in an image. At step 140, the spatial linear propagation module 110 receives task-specific affinity values for the pixels in the image. In an embodiment, the task-specific affinity values are generated by the guidance neural network model 120. The SLPN system is trained for a particular computer vision task. During training, parameters of the guidance neural network model 120 are determined for the particular computer vision task. In an embodiment, the guidance neural network model 120 and the spatial linear propagation module 110 are jointly trained for the particular computer vision task. After training, the parameters (e.g., coefficients) used by the guidance neural network model 120 are fixed and the guidance neural network model 120 generates task-specific affinity values for each input data, according to the parameters.

At step 145, the spatial linear propagation module 110 processes the input map and the task-specific affinity values to produce refined map data, where at least two task-specific affinity values aligned in a first pixel dimension are applied to spatially corresponding values in the input map to generate each refined value of the refined map data. For example, the at least two task-specific affinity values may be aligned in either the horizontal (in the same row) or vertical (in the same column) direction. As shown in FIG. 1B, the three task-specific affinity values are applied to spatially corresponding values in column 130 of the input map to compute three intermediate values in the adjacent column 131. The three intermediate values are combined to compute the refined map data in the adjacent column 132.

The spatial linear propagation network system 100 is differentiable, so that the task-specific affinity matrix $w_t$ can be learned in a data-driven manner. In an embodiment, the guidance neural network model 120 is a deep CNN that outputs all elements of the task-specific affinity matrix, $w_t$. In an embodiment, the spatial linear propagation module 110 receives the input map and outputs a transformed result comprising refined map data. The spatial linear propagation module 110 also receives $w_t$ generated by the guidance neural network model 120 based on the input data corresponding to the input map.

Assuming an input map of size n×n×c is input to the spatial linear propagation module 110, the guidance neural network model 120 should output a weight map with the dimensions of n×n×c×(3×4), i.e., each pixel in the input map is paired with 3 scalar weights per direction, and 4 directions in total. The input data has c channels (e.g., an RGB image has c=3). The spatial linear propagation module 110 contains four independent hidden layers for the different directions, where each layer combines the input map with its respective weight map using Equation (2). All submodules are differentiable and jointly trained using stochastic gradient descent (SGD). In an embodiment, node-wise max-pooling is used to integrate the hidden layers and to obtain the final propagation result.

Because the spatial propagation in Equation (3) is differentiable, the transformation matrix can be easily configured as a row/column-wise fully-connected layer. However, because the task-specific affinity matrix indicates the pairwise similarities of a specific input, the guidance neural network model 120 should also be conditioned on the content of this input (i.e., different input images should have different affinity matrices). Instead of setting the $w_t$ matrices as fixed parameters of the spatial linear propagation module 110, the task-specific affinity matrix values are the outputs of a deep CNN, which can be directly conditioned on an input image.

Model stability is of critical importance for designing linear systems, such as the spatial linear propagation network system 100. In the context of spatial propagation according to Equation (3), to ensure stability, the responses or errors that flow in the spatial linear propagation module 110 may be restricted from going to infinity and preventing the spatial linear propagation network system 100 from encountering the vanishing of gradients in the backpropagation process. Specifically, the norm of the temporal Jacobian $\partial h_t / \partial h_{t-1}$ should be equal to or less than one. Restricting the norm of the temporal Jacobian to be equal to or less than one is equivalent to regularizing each transformation matrix $w_t$ with its norm satisfying $$\|\partial h_t / \partial h_{t-1}\| = \|w_t\| \leq \lambda_{max},$$

where $\lambda_{max}$ denotes the largest singularity value of $w_t$. The condition, $\lambda_{max} \leq 1$ provides a sufficient condition for stability. Stability of the spatial linear propagation module 110 can be maintained by regularizing all weights of a pixel in the hidden layer H, limiting the summation of the absolute values of the weights for each pixel to less than one. For a three-way connection, the three weights may be regularized.

Figure 2A:
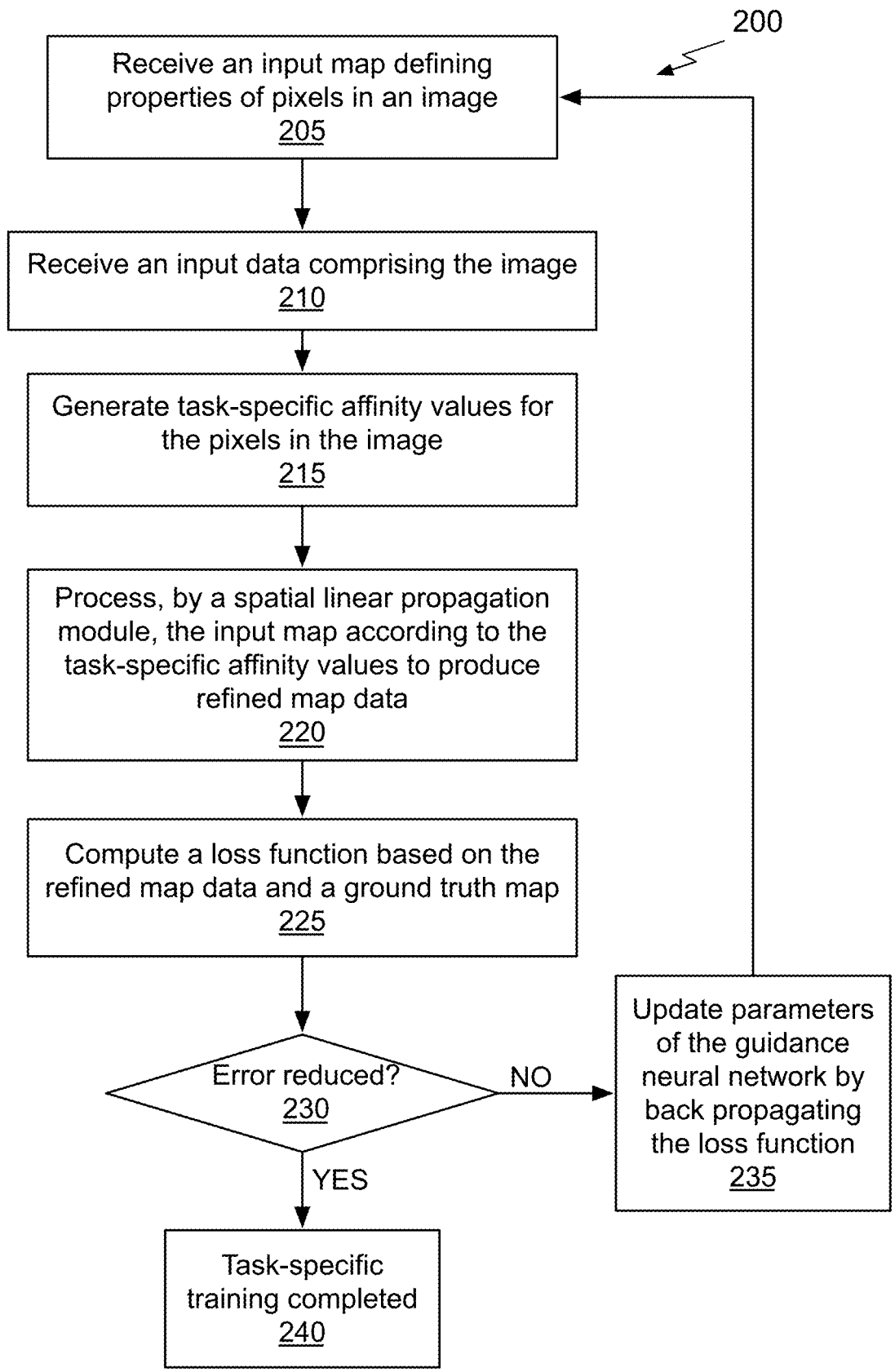
FIG. 2A illustrates a flowchart of a method for training the SLPN system shown in FIG. 1A, in accordance with an embodiment.

FIG. 2A illustrates a flowchart of a method for training the SLPN system 100 shown in FIG. 1A, in accordance with an embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor capable of performing the spatial linear propagation operations. Furthermore, persons of ordinary skill in the art will understand that any system that performs method 200 is within the scope and spirit of embodiments of the present invention.

At step 205, the spatial linear propagation module 110 receives an input map defining properties of pixels in an image. At step 210, the guidance neural network model 120 receives input data comprising the image. During training, the input map and the input data are included in a training dataset for a particular computer vision task. Each image in the input data is paired with a ground truth segmentation mask. In an embodiment, the input map is not included with the training dataset and is instead generated from either the ground truth segmentation mask or the input data.

At step 215, the guidance neural network model 120 generates task-specific affinity values for the pixels in the image. At step 220, the spatial linear propagation module 110 processes the input map according to the task-specific affinity values to produce refined map data. At step 225, a loss function is computed based on the refined map data and a ground truth map. For example, when the computer vision task is segmentation, the ground truth map is a segmentation mask.

At step 230, a determination is made whether an error between the refined map data and the ground truth map is reduced below a threshold value to achieve a defined accuracy. If so, at step 240 the task-specific training is completed. Otherwise, at step 235, parameters of the guidance neural network model 120 are updated by back propagating the loss function before returning to step 205 to receive another input map corresponding to an image from the training dataset. After training, the parameters (e.g., coefficients) used by the guidance neural network model 120 are fixed and the guidance neural network model 120 generates task-specific affinity values for each input data, according to the parameters.

Figure 2B:
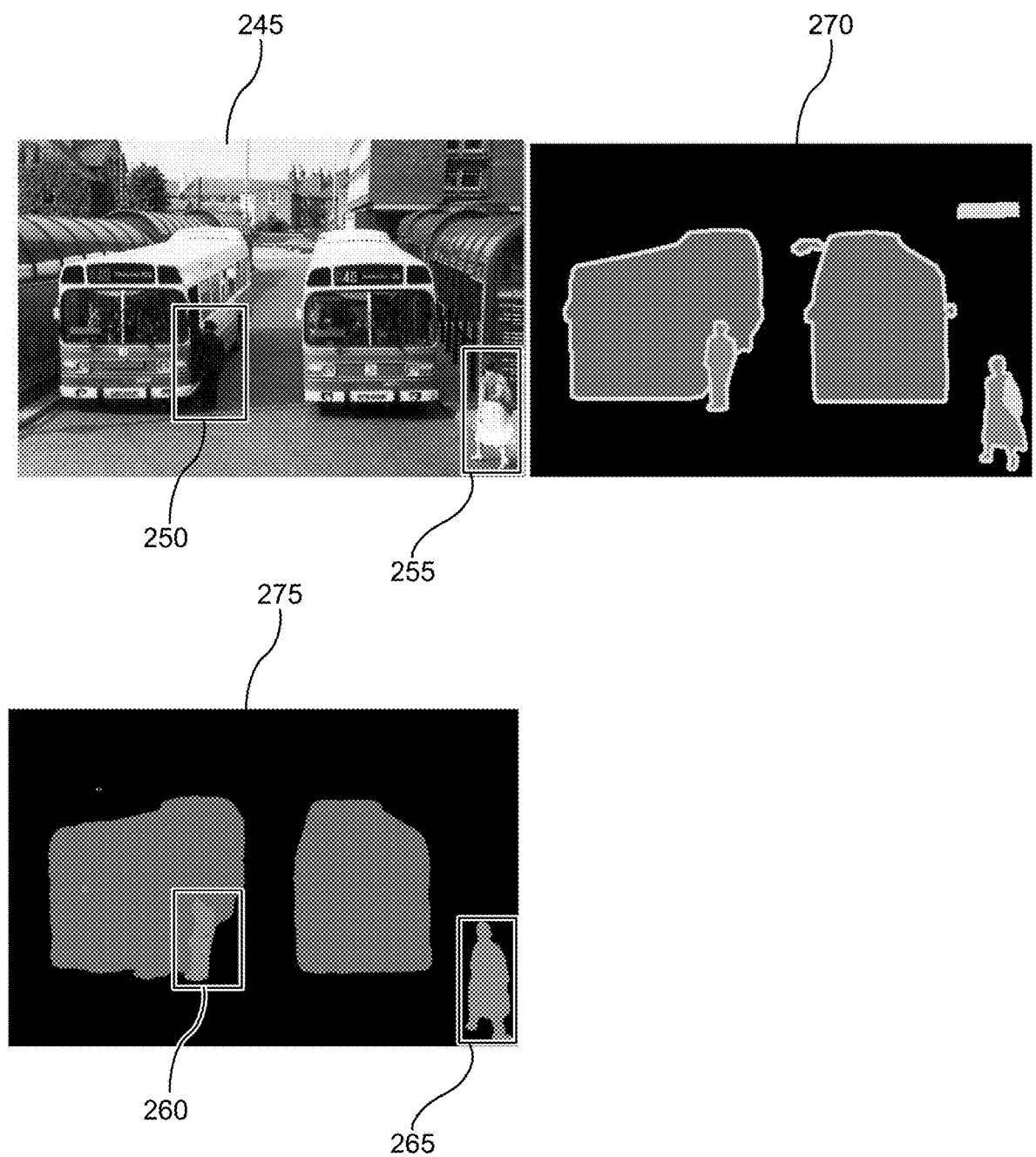
FIG. 2B illustrates an example of refined map data generated by the SLPN system shown in FIG. 1A, in accordance with an embodiment.

FIG. 2B illustrates an example of a refined affinity map generated by the SLPN system 100 shown in FIG. 1A, in accordance with an embodiment. An input image 245 is received including two buses and two pedestrians 250 and 255. The ground truth semantic segmentation map 270 indicates the two pedestrians 250 and 255 are both separate from the two buses. The refined map data 275 generated by the SLPN system 100 also indicates the two pedestrians 260 and 265 are both separate from the two buses. Given a coarse image segmentation mask as the input map, the spatial linear propagation module 110 produces higher-quality segmentation masks with significantly refined details at object boundaries. In contrast, conventional models generate low-resolution segmentation masks with coarse boundary shapes to seek a balance between computational efficiency and semantic accuracy.

In sum, spatial linear propagation network system 100 can transform a two-dimensional (2D) input map (e.g., coarse image segmentation) into refined map data with desired properties (e.g., refined segmentation). With spatially varying parameters supporting the propagation process, the spatial linear propagation network system 100 can be configured to perform a standard anisotropic diffusion process. The transformation of the input maps is controlled by a Laplacian matrix that is constituted by the task-specific affinity values generated by the guidance neural network model 120. Since the spatial linear propagation network system 100 is differentiable, the parameters can be learned through joint training. Importantly, each refined map is generated in a single pass through the spatial linear propagation network system 100 and the number of connections is reduced, reducing the computations needed to generate each refined map.

The spatial linear propagation network system 100 can be trained to perform operations other than object segmentation. In an embodiment, the spatial linear propagation network system 100 is trained to perform affinity-based editing, such as colorization, where the input map is color values associated a subset of the pixels within an image and the refined map data is colorized version of the image. A user may apply the color values to portions of the image. In another embodiment, the input map is segmentation data for an image in a video sequence, the task-specific affinity values are motion affinity values, and the refined map data is segmentation data for a subsequent image in the video sequence. In yet another embodiment, the spatial linear propagation network system 100 is trained to perform affinity-based editing, where the input map includes a value associated with a subset of the pixels within an image and the refined map data includes a region of the image with pixels set to the value, the region including the subset of the pixels and additional pixels determined according to the task-specific affinity values.

Parallel Processing Architecture

Figure 3:
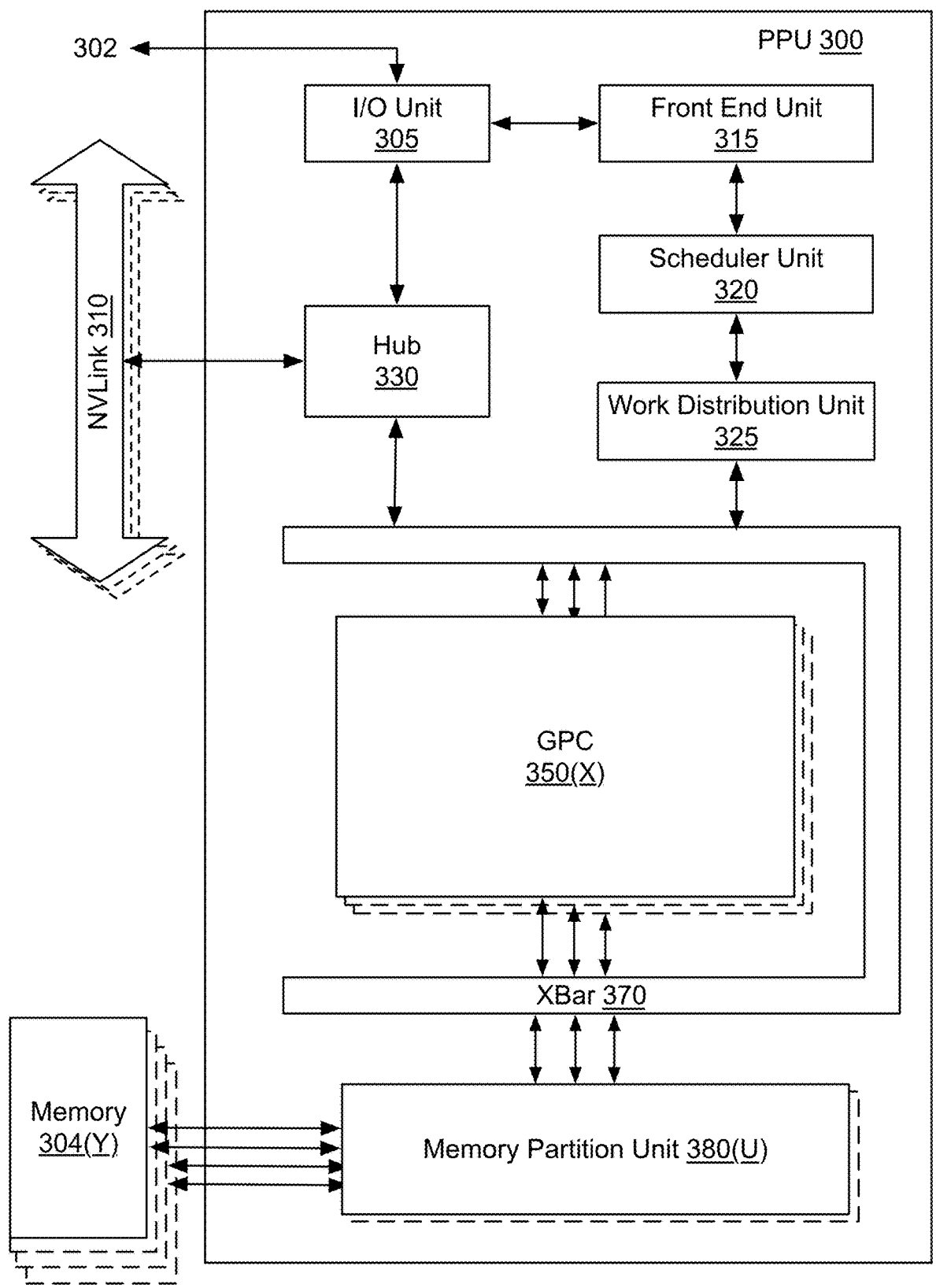
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
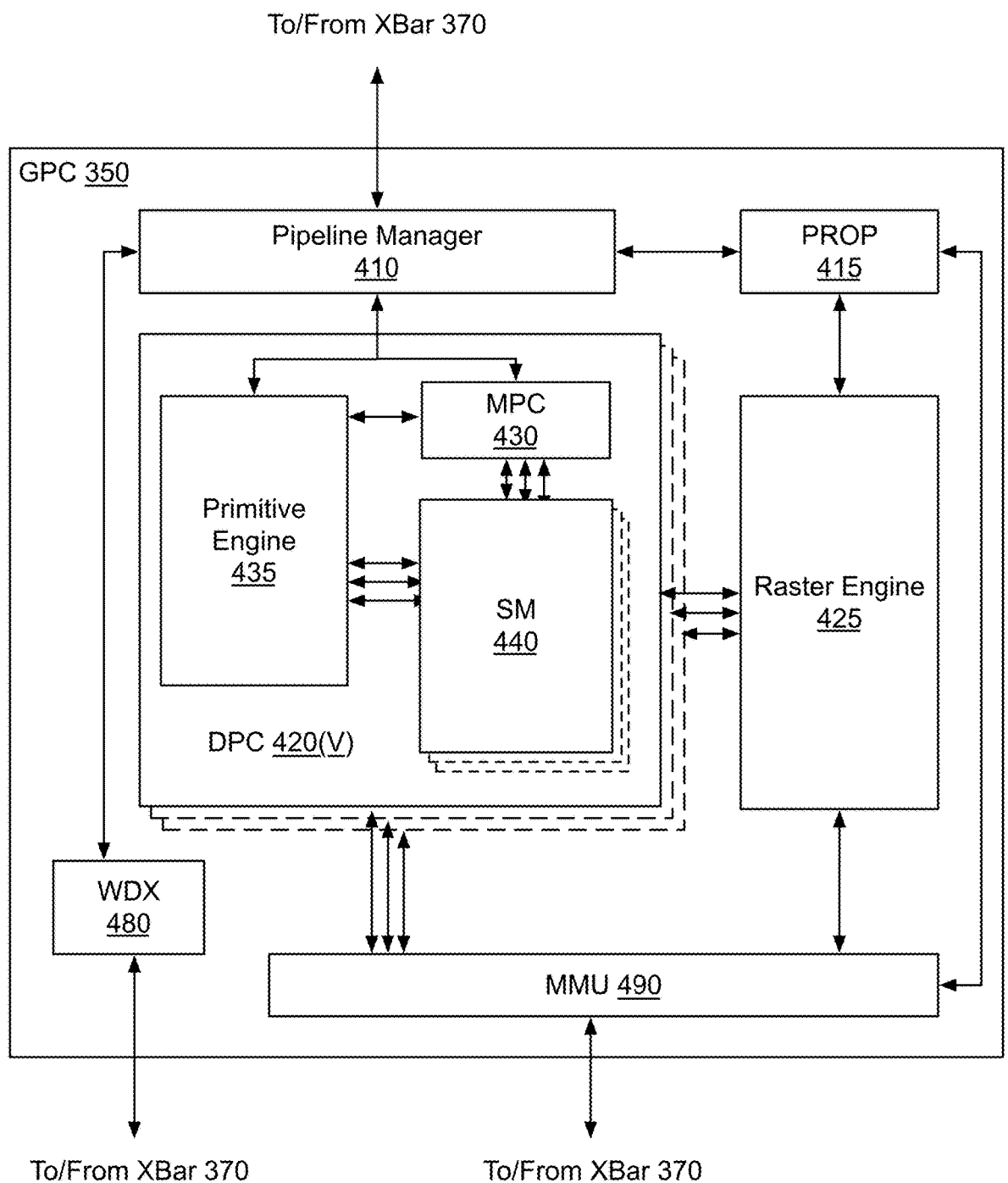
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
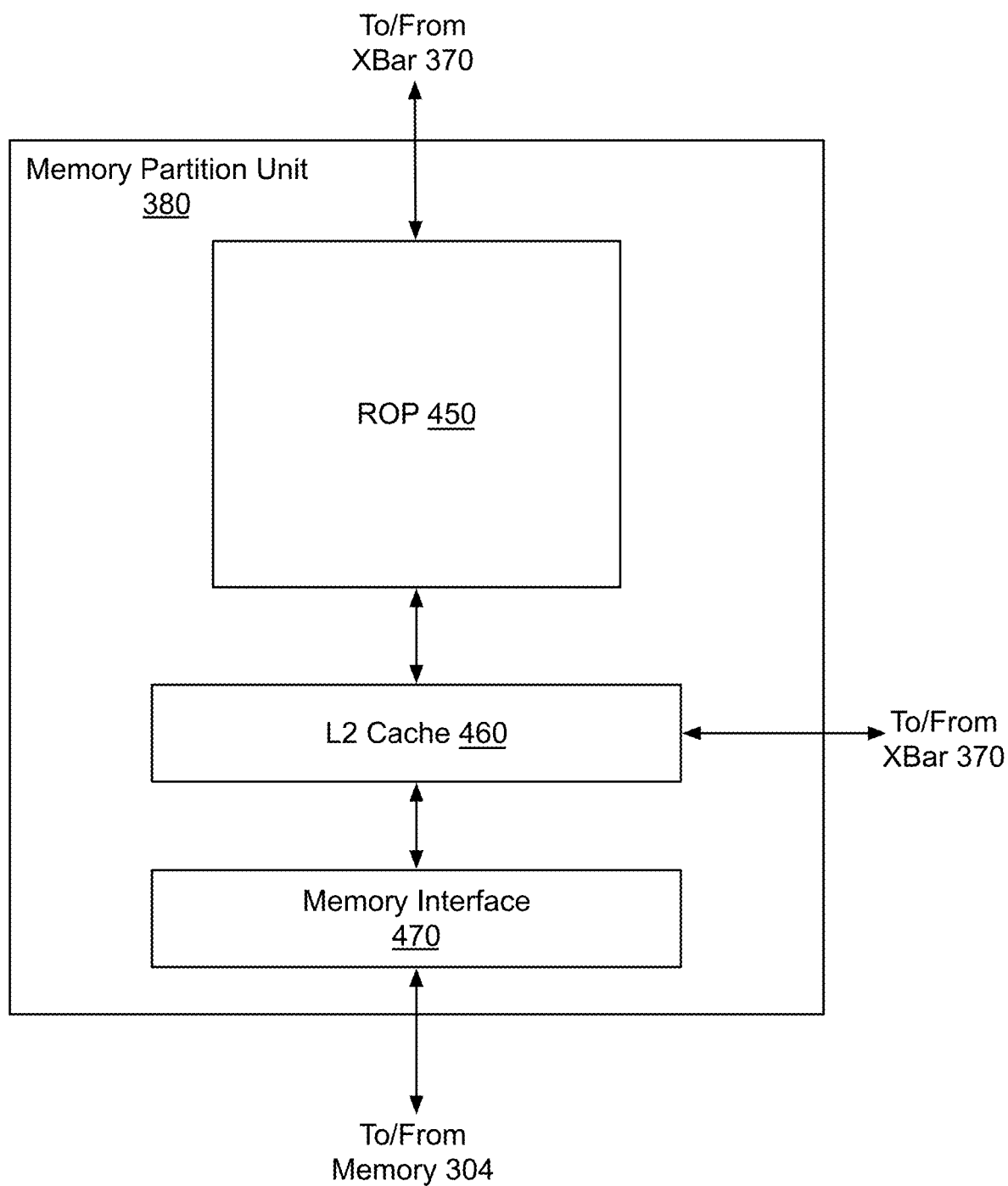
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiments, the ROP unit 450 may be outside of the memory partition unit 380. For example, the ROP unit 450 may reside in the GPC 350 or another unit.

Figure 5A:
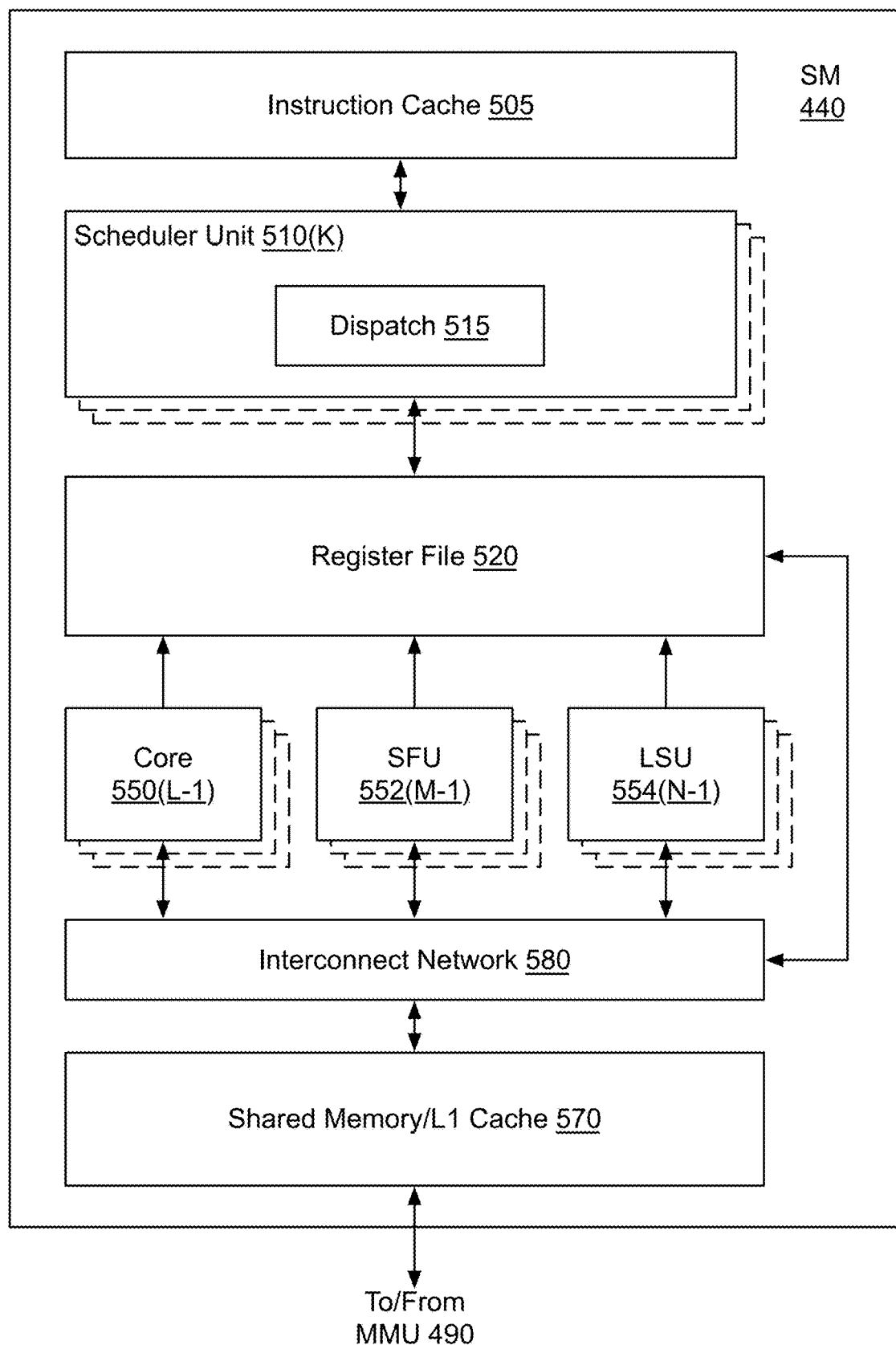
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement to fxture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
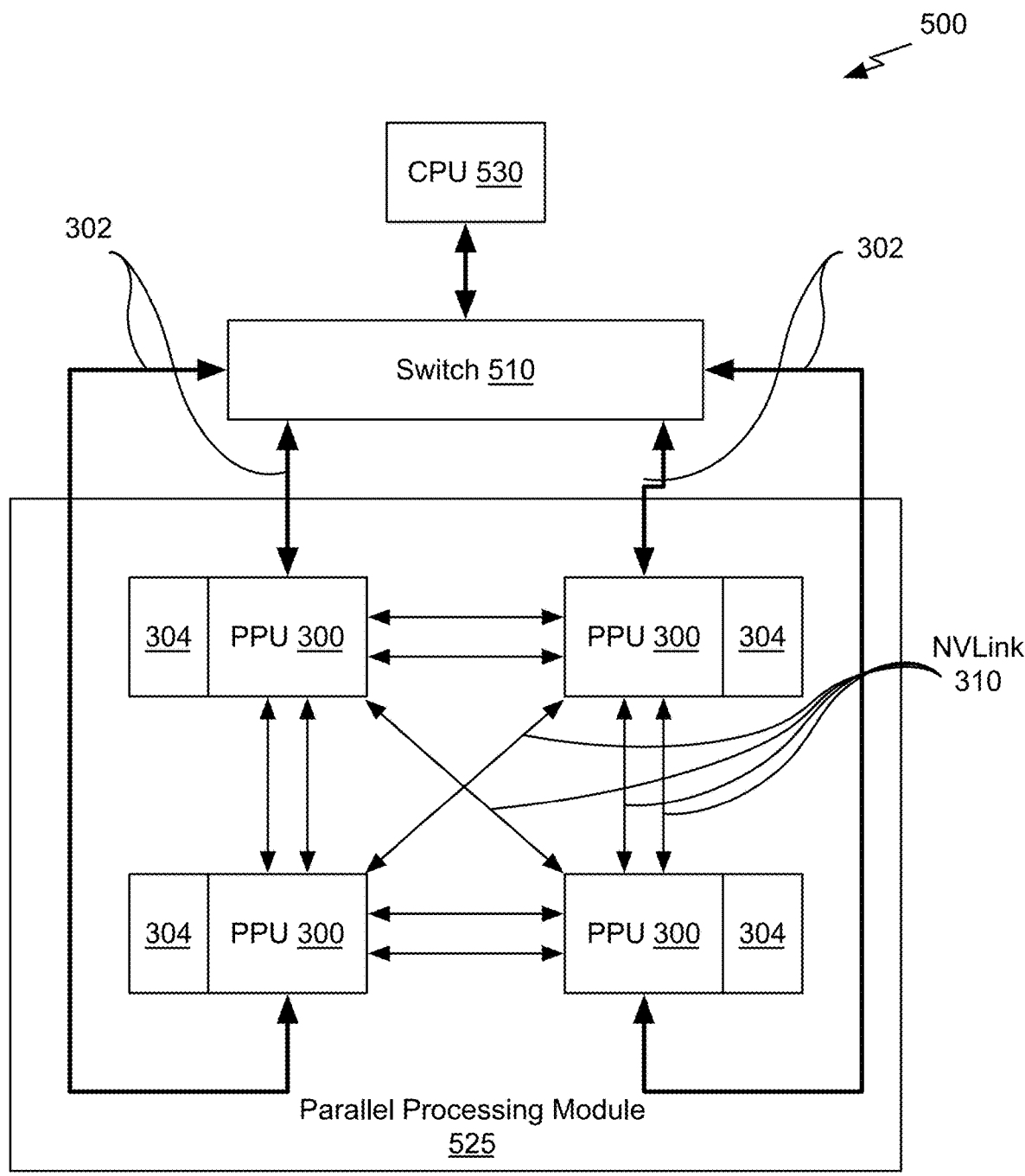
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 130 shown in FIG. 1D and/or the method 200 shown in FIG. 2A. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
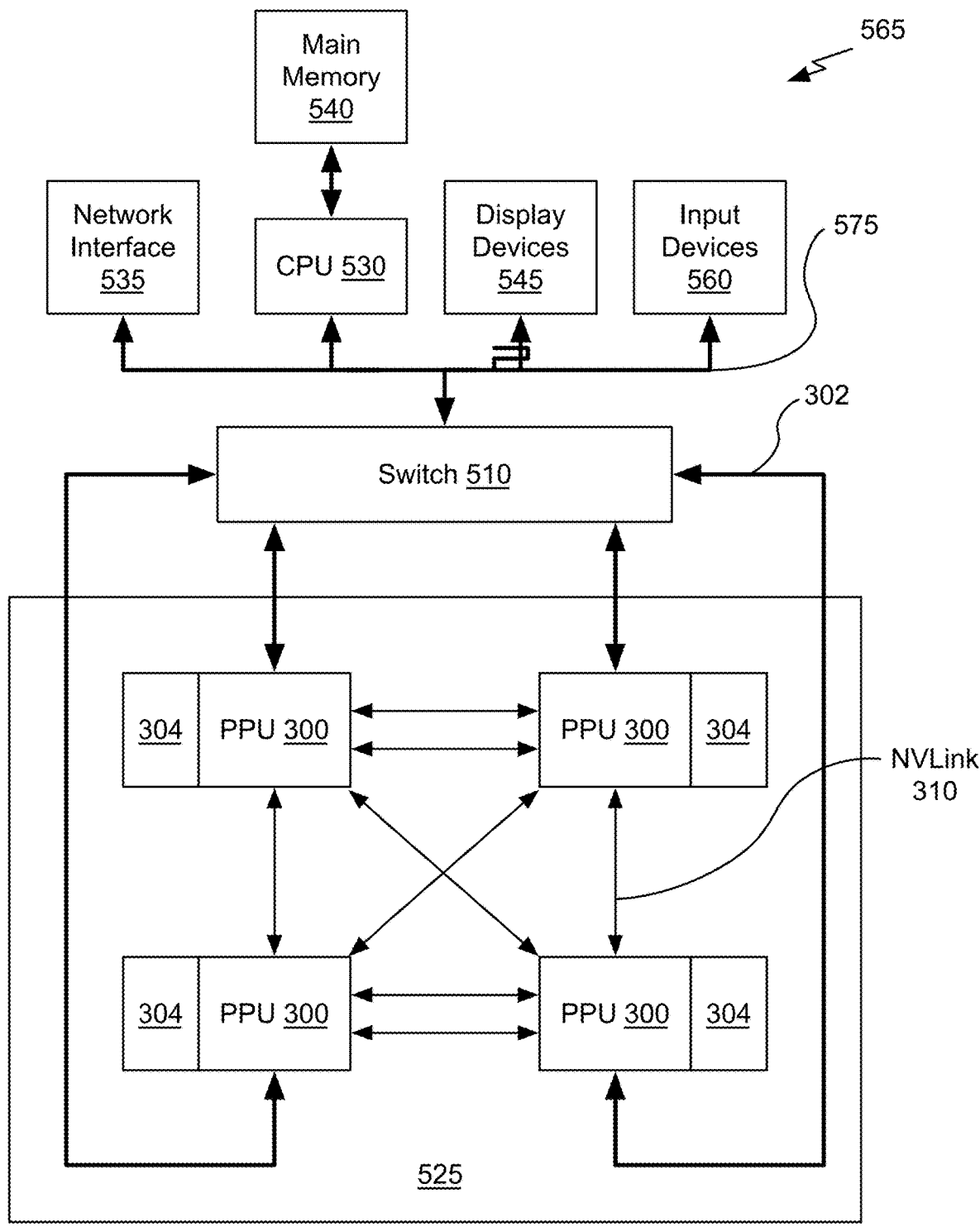
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 130 shown in FIG. 1D and/or the method 200 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
  receiving an input map defining properties of pixels in an image;
  receiving task-specific affinity values for the pixels in the image; and
  processing, by a spatial linear propagation module, the input map and the task-specific affinity values to produce refined map data, wherein at least two task-specific affinity values aligned in a first pixel dimension are applied to spatially corresponding values in the input map to generate each refined value of the refined map data.

2. The computer-implemented method of claim 1, wherein each refined value is in a row or column adjacent to the at least two task-specific affinity values.

3. The computer-implemented method of claim 2, wherein the processing comprises recursively applying columns of the task-specific affinity values to the spatially corresponding values in the input map such that the refined values calculated for a column contribute to the refined value in an adjacent column.

4. The computer-implemented method of claim 3, wherein the recursively applying is performed for the columns in a first direction along the first pixel dimension, for the columns in a second direction opposing the first direction, for rows in a third direction along a second pixel dimension, and for rows in a fourth direction opposing the third direction to compute four intermediate values for each pixel of the refined data map.

5. The computer-implemented method of claim 4, wherein the processing further comprises combining the four intermediate values for each pixel of the refined data map to produce the refined value for the pixel.

6. The computer-implemented method of claim 1, wherein a sum of the task-specific affinity values in a column is less than or equal to one.

7. The computer-implemented method of claim 1, wherein a guidance neural network model generates the task-specific affinity values based on input data corresponding to the input map.

8. The computer-implemented method of claim 7, wherein the guidance neural network model is jointly trained with the spatial linear propagation module using a training dataset for the task.

9. The computer-implemented method of claim 7, wherein the guidance neural network model is a convolutional neural network model.

10. The computer-implemented method of claim 1, wherein the input map is coarse segmentation data for an image and the refined map data is refined segmentation data for the image.

11. The computer-implemented method of claim 1, wherein the input map is color values associated a subset of the pixels within an image and the refined map data is colorized version of the image.

12. The computer-implemented method of claim 1, wherein the input map is segmentation data for an image in a video sequence, the task-specific affinity values are motion affinity values, and the refined map data is segmentation data for a subsequent image in the video sequence.

13. The computer-implemented method of claim 1, wherein the input map includes a value associated a subset of the pixels within an image and the refined map data includes a region of the image with pixels set to the value, the region including the subset of the pixels and additional pixels determined according to the task-specific affinity values.

14. A system, comprising:
a spatial linear propagation module configured to:
receive an input map defining properties of pixels in an image;
receive task-specific affinity values for the pixels in the image; and
process the input map and the task-specific affinity values to produce refined map data, wherein at least two task-specific affinity values aligned in a first pixel dimension are applied to spatially corresponding values in the input map to generate each refined value of the refined map data.

15. The system of claim 14, wherein each refined value is in a row or column adjacent to the at least two task-specific affinity values.

16. The system of claim 15, wherein the spatial linear propagation module is further configured to recursively apply columns of the task-specific affinity values to the spatially corresponding values in the input map such that the refined values calculated for a column contribute to the refined value in an adjacent column.

17. The system of claim 16, wherein the spatial linear propagation module is further configured to recursively apply the columns in a first direction along the first pixel dimension, the columns in a second direction opposing the first direction, rows in a third direction along a second pixel dimension, and rows in a fourth direction opposing the third direction to compute four intermediate values for each pixel of the refined data map.

18. The system of claim 17, wherein the spatial linear propagation module is further configured to combine the four intermediate values for each pixel of the refined data map to produce the refined value for the pixel.

19. The system of claim 14, further comprising a guidance neural network model configured to generate the task-specific affinity values based on input data corresponding to the input map.

20. A non-transitory computer-readable media storing computer instructions for spatial linear propagation that, when executed by one or more processors, cause the one or more processors to perform the steps of:

receiving an input map defining properties of pixels in an image;

receiving task-specific affinity values for the pixels in the image; and processing, by a spatial linear propagation module, the input map and the task-specific affinity values to produce refined map data, wherein at least two task-specific affinity values aligned in a first pixel dimension are applied to spatially corresponding values in the input map to generate each refined value of the refined map data.

* * * * *